Patented Oct. 11, 1932

1,882,285

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

BROMINATION PRODUCT OF THE DIBENZANTHRONE SERIES

No Drawing. Application filed March 9, 1929, Serial No. 345,880, and in Germany March 13, 1928.

We have found that brominated products of the dibenzanthrone series are readily obtained by acting on dibenzanthrones which term is meant to comprise dibenzanthrone, isodibenzanthrone and derivatives thereof, with bromine or agents furnishing the same in a sulphuric acid which expression is to be understood as comprising concentrated sulphuric acid, oleum and chlorosulphonic acid, in the presence of a halogen carrier. The temperature at which the bromination is to be carried out depends on the kind of sulphuric acid employed, on the degree of bromination to be obtained, the amount of bromine taken, and on the specific halogen carrier employed. It should, however, be kept in mind that at higher temperatures sulphonation of the dibenzanthrones and even oxidation thereof occurs, which side reactions, however, are avoided with certainty when raising the temperature not above 90° C. As halogen carriers those usually employed in halogenation processes are suitable, for instance, iodine, sulphur, selenium, iron, manganese, nickel, molybdenum, arsenic, bismuth, mercury and antimony. As stated above, the number of bromine atoms entering each molecule of the initial material depends not only on the temperature and the amount of bromine employed, but also to a large extent on the specific halogen carrier; in some cases it is advisable to carry out the bromination in the presence of two or more halogen carriers.

When carrying out the bromination in chlorosulphonic acid, products are obtained which in most cases contain chlorine besides bromine, in particular when carrying out the process above 50° C., but also at lower temperatures chlorination takes place in most cases, but the proportion of chlorine and bromine entering the molecule is changed in favor of bromine. Here too, the degree of chlorination and the proportion of bromine and chlorine entering the molecule of the dibenzanthrone largely depend on the halogen carrier used. Only when brominating in chlorosulphonic acid in the presence of antimony, practically no chlorination takes place even at higher temperatures.

The brominated dibenzanthrones of which excellent yields are obtained and in a pure state, constitute dyestuffs possessing valuable properties, especially those produced in chlorosulphonic acid, dyeing the vegetable fibre strong, usually blue to violet shades, extremely fast to chlorine. The dyeings obtained from the dyestuffs prepared under mild conditions as regards the temperature are still more fast to washing and bucking than those of the products obtained at higher temperatures. The products may be purified, if desired, by recrystallization from organic solvents, or by dissolving them in concentrated sulphuric acid and reprecipitating them by diluting the solution with water, or by treating them with oxidizing agents, for example, with an alkaline sodium hypochlorite solution.

The following examples will further illustrate the nature of the invention which however is not limited to these examples. The parts are by weight.

Example 1

46 parts of dibenzanthrone are stirred with 460 parts of chlorosulphonic acid and 4 parts of sulphur at ordinary temperature, and treated with 17 parts of bromine, and are then warmed to from 65° to 70° C. until the bromine has been completely taken up. After cooling, the reaction mixture is diluted with concentrated sulphuric acid and poured onto ice, the resulting precipitate being filtered by suction, washed until neutral and dried. The monochloro-dibromo-dibenzanthrone thus obtained is a blue violet powder which dissolves in concentrated sulphuric acid, giving a violet solution, and gives very fast blue dyeings on cotton from a blue violet vat.

Example 2

46 parts of isodibenzanthrone are dissolved, while stirring, in 460 parts of chlorosulphonic acid, 4 parts of sulphur and 17 parts of bromine being added, and the temperature raised to from 65° to 70° C. at which temperature the mass is maintained until the reaction is complete. After cooling, the further treatment is carried out as in Example 1. The resulting mono-chloro-dibromo-isodibenzanthrone is a violet powder, which dissolves in concentrated sulphuric acid to give a yellow green solution, and gives clear strong violet dyeings on cotton, very fast to water, from a blue vat.

*Example 3*

After the addition of 4 parts of sulphur and 70 parts of bromine, a solution of 46 parts of dibenzanthrone, in 460 parts of chlorosulphonic acid is stirred and the temperature slowly raised to from 65° to 70° C. at which temperature it is maintained until the greater portion of the bromine has been taken up. It is then allowed to cool, and is treated as in Example 1. The resulting blue powder, a tetrabromodichlorodibenzanthrone, dissolves in concentrated sulphuric acid to give a violet solution, and gives very fast blue dyeings on cotton from a blue vat with a violet tinge.

*Example 4*

46 parts of isodibenzanthrone are dissolved, while stirring, in 460 parts of chlorosulphonic acid, and, after the addition of 4 parts of sulphur and 60 parts of bromine, are slowly warmed to from 65° to 70° C. When the greater portion of the added bromine has been taken up, the mixture is allowed to cool, and is treated as in Example 1. The resulting tetrabromo-dichloro-isodibenzanthrone, a violet powder, dissolves in a yellow green solution in concentrated sulphuric acid, and gives very fast violet dyeings on cotton from a blue vat.

*Example 5*

35 parts of bromine are introduced at ordinary temperature into a solution of 46 parts of dibenzanthrone in 460 parts of chlorosulphonic acid to which 4 parts of selenium have been added. The reaction mixture is heated at between 65° and 70° C., while stirring, until the bulk of the bromine is taken up. The reaction mixture is allowed to cool and worked up in the usual manner. The tribromo-dichloro-dibenzanthrone so obtained is a dark violet powder which dissolves in concentrated sulphuric acid to give a violet solution and which dyes cotton from a blue vat in very fast strong red violet shades.

If the same amount of iodine be added to the reaction mixture instead of selenium, a tribromo-dichloro-dibenzanthrone is obtained which gives blue violet shades, the other properties being equal to those of the above-mentioned product.

The reaction product obtained from isodibenzanthrone under the conditions specified in this example, with the addition of selenium, dyes cotton in strong, clear red violet shades, whereas the reaction product containing chlorine and bromine obtained from isodibenzanthrone in chlorosulphonic acid by the action of bromine and employing iodine as halogen carrier dyes in fast violet shades from a blue vat.

*Example 6*

46 parts of pure isodibenzanthrone are dissolved in 460 parts of chlorosulphonic acid at ordinary temperature, while stirring; after the addition of 4 parts of antimony 35 parts of bromine are introduced into the reaction mixture, the temperature of which is slowly raised to between 60° and 70° C. and maintained at this temperature until the bulk of the bromine is taken up. The reaction mixture is then allowed to cool and worked up in the usual manner. The reaction product obtained is a blue violet powder, which dissolves in concentrated sulphuric acid to give a yellow green solution and which dyes cotton from a blue vat in clear very fast blue violet shades. The dibenzanthrone derivative produced in an analogous manner dyes cotton in very fast strong pure blue shades.

*Example 7*

46 parts of pure dibenzanthrone are dissolved in 460 parts of chlorosulphonic acid at ordinary temperature. 4 parts of selenium and 4 parts of iodine are added to the solution and 35 parts of bromine are run in while stirring. The temperature is slowly raised to 70° C. until the bulk of the bromine is taken up, the reaction mixture is then allowed to cool and worked up as usual. The tribromo-dichloro-dibenzanthrone obtained is a dark violet powder which dissolves in concentrated sulphuric acid to give a violet solution and dyes cotton from a blue vat in very fast blue shades with a violet tinge.

The isodibenzathrone derivative obtained in an analogous manner dyes in violet shades.

If the idodine in the reaction mixture be replaced by sulphur, products of a similar composition are obtained which, however, dye in more bluish shades than those obtained with iodine and selenium.

*Example 8*

46 parts of dibenzanthrone are dissolved in 460 parts of chlorosulphonic acid at between 0° and 5° C. and into the solution 9 parts of bromine are introduced after the addition of 4 parts of selenium. After about 2 hours the whole of the bromine is taken up; the reaction mass is then diluted with 230 parts of concentrated sulphuric acid, poured into ice water and the dyestuff formed is filtered off by suction. The product is a dark violet powder containing about 8 per cent of bromine and 4 per cent of chlorine and dissolves in concentrated sulphuric acid to give a violet solution. Cotton is dyed therewith from a blue violet vat in strong dark blue shades with a red tinge.

Example 9

46 parts of isodibenzanthrone are dissolved at ordinary temperature in 460 parts of 23 per cent oleum, 4 parts of iodine and 17 parts of bromine being then added, and the whole is stirred at the said temperature until the bulk of the bromine is taken up. The reaction mass is worked up as described in the foregoing example. The dyestuff obtained in an excellent yield is a violet powder which dissolves in concentrated sulphuric acid to give a green solution and dyes cotton from a blue vat in strong clear blue violet shades of very good fastness. The dyestuff contains about 25 per cent of bromine. If only 9 parts of bromine be employed instead of 17 parts thereof, a reaction product is obtained containing about 19 per cent of bromine which dyes in violet shades with a reddish tinge and which dissolves in concentrated sulphuric acid to give a green solution.

When treating a solution of 46 parts of dibenzanthrone in 460 parts of chlorosulphonic acid with 17 parts of bromine in the presence of 4 parts of iodine in an analogous manner a dyestuff containing about 20 per cent of bromine and 1 to 2 per cent of chlorine is obtained which dyes cotton in marine blue shade from the vat.

Example 10

27 parts of bromine are run into a solution of 46 parts of dibenzanthrone in 460 parts of chlorosulphonic acid at ordinary temperature after the addition of 4 parts of selenium while stirring. The temperature is then raised to between 35° and 40° C. and stirring is continued until the bulk of the bromine is taken up. The reaction mixture is then worked up as described in Example 8. A dyestuff is obtained in the form of a dark violet powder containing about 26 to 27 per cent of bromine and 4 to 5 per cent of chlorine, which dissolves in concentrated sulphuric acid to give a violet solution and which dyes the vegetable fibre from a blue violet vat in strong fast blue violet shades.

The dyestuff obtained from isodibenzanthrone under the said conditions dyes cotton from a blue vat in red violet shades.

If sulphur, iron, nickel or manganese be employed instead of selenium, in both cases products which dye in more bluish shades are obtained.

Example 11

46 parts of dibenzanthrone are dissolved in 460 parts of 96 per cent sulphuric acid. 25 parts of bromine are introduced at ordinary temperature into the said solution, to which 2 parts of iodine and 2 parts of sulphur have been added. The reaction mixture is then warmed to between 70° and 80° C. and stirred until all of the bromine has been consumed. After cooling, the reaction mixture is worked up as usual. The brominated dyestuff is a violet blue powder, dissolving to violet solution in concentrated sulphuric acid and dyeing cotton marine blue shades from a blue violet vat.

Example 12

35 parts of bromine are slowly introduced into a stable solution of 46 parts of pure dibenzanthrone in 460 parts of chlorosulphonic acid to which 4 parts of antimony have been added, at ordinary temperature, stirring being continued for some hours. The reaction mixture is then warmed to between 45° and 55° C. and stirring continued at the said temperature until the bromine has been taken up. After cooling, the reaction mixture is diluted with about 200 parts of concentrated sulphuric acid, poured onto ice, boiled up and the reaction product filtered by suction and washed until neutral, after washing it, if desired, with a dilute soda solution. The reaction product is a tribromodibenzanthrone dissolving to a violet solution in concentrated sulphuric acid and dyeing cotton strong marine blue shades from a blue vat with a violet tinge.

Example 13

10 parts of the blue dyestuff obtainable by alkylating dihydroxydibenzanthrone by means of the ethyl ester of p-toluene sulphonic acid, are dissolved, while stirring, in the tenfold amount of chlorosulphonic acid and slowly warmed to 60° C. after the addition of 0.5 part of iodine and 3 parts of bromine. The reaction mixture is kept at the said temperature until the bulk of the bromine has been taken up and is then worked up as usual. The dyestuff obtained is a violet powder dissolving in concentrated sulphuric acid to a blue violet solution and furnishes fast blue dyeings on cotton from a blue vat.

When carrying out the process at ordinary temperatures a dyestuff is obtained dissolving in concentrated sulphuric acid to a red violet solution and dyeing cotton from a blue vat strong blue green shades of good fastness properties.

Example 14

20 parts of bromine are added to a stirred solution of 46 parts of isodibenzanthrone in 460 parts of chlorosulphonic acid to which 0.4 part of antimony has been added. The reaction mixture is then warmed to between 50° and 60° C., stirring being continued until all of the bromine has been taken up. After dilution with 230 parts of concentrated sulphuric acid, the reaction mixture is poured onto ice, boiled up and worked up as usual. The dibromoisodibenzanthrone containing only small amounts of chlorine is obtained in the form of a violet powder and is a blue violet powder when dry, dissolving in concentrated sulphuric acid to a green solution and dyeing cotton from a blue vat excellently fast brilliant violet shades.

Other halogen carriers, for instance, sulphur, iodine, arsenic, nickel, manganese, iron, molybdenum, mercury and selenium may be employed instead of antimony.

Example 15

20 parts of bromine are introduced into a stirred solution of 46 parts of dibenzanthrone in 460 parts of chlorosulphonic acid to which 1.4 parts of selenium and 1.5 parts of iodine have been added. The reaction mixture is then warmed, while stirring, to 65° to 70° C., the said temperature being maintained until the bulk of the bromine has been taken up. After cooling, the reaction mixture is worked up as usual. The dibromodichlorodibenzanthrone obtained in an excellent yield is a dark blue powder dissolving to a violet solution in concentrated sulphuric acid and dyeing cotton from a violet blue vat very fast marine blue shades.

When treating isodibenzanthrone in the aforesaid manner a dibromodichloroisodibenzanthrone is obtained forming a violet powder dissolving to a green solution in concentrated sulphuric acid and dyeing cotton from a blue vat very fast clear violet shades.

Example 16

46 parts of bromine are run at ordinary temperature into a solution of 46 parts of dibenzanthrone in 400 parts of chlorosulphonic acid to which 4 parts of antimony have been added, the temperature being then raised to between 65° and 70° C. and the mixture stirred until the bulk of the bromine employed is taken up. The reaction mixture is then allowed to cool and worked up as usual. The tetrabromodibenzanthrone containing small amounts of chlorine is obtained as a blue violet powder and forms a dark blue powder when dry, dissolving to a violet solution in concentrated sulphuric acid and dyeing cotton from a violet blue vat marine blue shades with a slight greenish tinge of excellent fastness.

The reaction may also be carried out at somewhat lower temperatures.

The tetrabromoisodibenzanthrone containing still less chlorine can be prepared in an analogous manner and forms a violet powder dissolving to a green solution in concentrated sulphuric acid and dyeing cotton from a blue vat excellent fast clear violet shades.

Example 17

92 parts of bromine are dissolved in 460 parts of chlorosulphonic acid, 4 parts of antimony being then added, and 46 parts of dibenzanthrone are then introduced at ordinary temperature into the said stirred solution. After all of the dibenzanthrone has been added, the temperature is slowly raised to 70° C. and stirring continued until the bulk of the bromine has disappeared. The reaction mixture is then allowed to cool and worked up as usual. The pentabromodibenzanthrone obtained which contains a few per cent of chlorine is a dark blue powder dissolving to a violet solution in concentrated sulphuric acid and dyeing cotton fast marine blue shades from a violet vat. The pentabromisodibenzanthrone also containing a few per cent of chlorine obtained in an analogous manner is a violet powder dissolving to a green solution in concentrated sulphuric acid and dyeing cotton from a blue vat clear violet shades of very good fastness.

Example 18

35 parts of bromine are slowly introduced into a stirred solution of 46 parts of dibenzanthrone in 460 parts of chlorosulphonic acid to which 4 parts of sulphur have been added, the mixture being then slowly warmed to between 60° and 70° C. After the bulk of the bromine has been taken up, the reaction mixture is allowed to cool and worked up as usual. The tribromomonochlorodibenzanthrone obtained is a violet blue powder dissolving in concentrated sulphuric acid to a violet solution and dyes cotton from a violet vat excellent fast marine blue shades.

Other halogen carriers, for instance iodine, selenium, mercury, or bismuth, or the like, may be employed instead of sulphur.

The tribromomonochloroisodibenzanthrone obtained in an analogous manner dissolves to a green solution in concentrated sulphuric acid and dyes cotton from a blue vat strong clear violet shades of excellent fastness.

Example 19

23 parts of dibenzanthrone are dissolved at room temperature, while stirring, in 200 parts of chlorosulphonic acid, and, after adding 1.2 parts of iodine and 4.5 parts of bromine, the mixture is heated to about 45° to 50° C. After all bromine has been taken up, the mixture is allowed to cool and then worked up in the usual manner. The resulting monochloro-monobromo-dibenzanthrone is a blue violet powder, dissolving to a violet solution in concentrated sulphuric acid and dyeing cotton from a blue violet vat strong, very fast reddish blue shades.

In an analogous manner monochloro-monobromo-isodibenzanthrone is obtained from isodibenzanthrone. The said product dissolves to a green solution in concentrated sulphuric acid and dyes cotton violet shades.

What we claim is:—

1. As a new article of manufacture monochloro-dibromo-dibenzanthrone, forming a blue violet powder, dissolving to a violet solution in concentrated sulphuric acid and dyeing cotton from a blue violet vat very fast blue shades.

2. As new articles of manufacture dibenzanthrones containing at least one atomic proportion of chlorine and bromine.

3. As new articles of manufacture dibenzanthrones containing at least two atomic proportions of bromine and at least one atomic proportion of chlorine.

4. As a new article of manufacture tribromo-dichloro-dibenzanthrone forming a dark violet powder dissolving in concentrated sulphuric acid to give a violet solution and dyeing cotton from a blue vat fast blue shades with a violet tinge.

5. As a new article of manufacture tetrabromodichlorodibenzanthrone dissolving in concentrated sulphuric acid to give a violet solution and dyeing cotton fast blue shades from a blue vat with a violet tinge.

In testimony whereof we have hereunto set our hands.

MAX ALBERT KUNZ.
KARL KOEBERLE.